(12) United States Patent
Takeuchi

(10) Patent No.: US 6,191,905 B1
(45) Date of Patent: Feb. 20, 2001

(54) MAGNETIC DISC APPARATUS

(75) Inventor: Toshio Takeuchi, Tokyo (JP)

(73) Assignee: NEC Corporation, Tokyo (JP)

( * ) Notice: Under 35 U.S.C. 154(b), the term of this patent shall be extended for 0 days.

(21) Appl. No.: 09/265,853

(22) Filed: Mar. 11, 1999

(30) Foreign Application Priority Data

Mar. 20, 1998 (JP) .................................................. 10-071819

(51) Int. Cl.[7] ...................................................... G11B 5/09
(52) U.S. Cl. ................................................. 360/51; 360/53
(58) Field of Search .................... 360/51, 53, 46

(56) References Cited

U.S. PATENT DOCUMENTS 5,760,982 * 6/1998 Stein ....................................... 360/31
5,995,305 * 11/1999 McNeil et al. ........................ 360/31

* cited by examiner

*Primary Examiner*—W. Chris Kim
(74) *Attorney, Agent, or Firm*—Young & Thompson

(57) ABSTRACT

The present invention provides a magnetic disc apparatus comprising: a magnetic disc and a signal processor having functions of (i) setting measurement points at an interval which is smaller in the vicinity of an initial position of a window than in the vicinity of the maximum modification position; (ii) shifting the window from the initial position up to the maximum modification position; (iii) each time the window position is shifted according to the aforementioned interval, reproducing a check data recorded on the magnetic disc, so as to measure an error rate; and (iv) using the error rate measurement results so as to obtain an optimal position of the window.

9 Claims, 15 Drawing Sheets

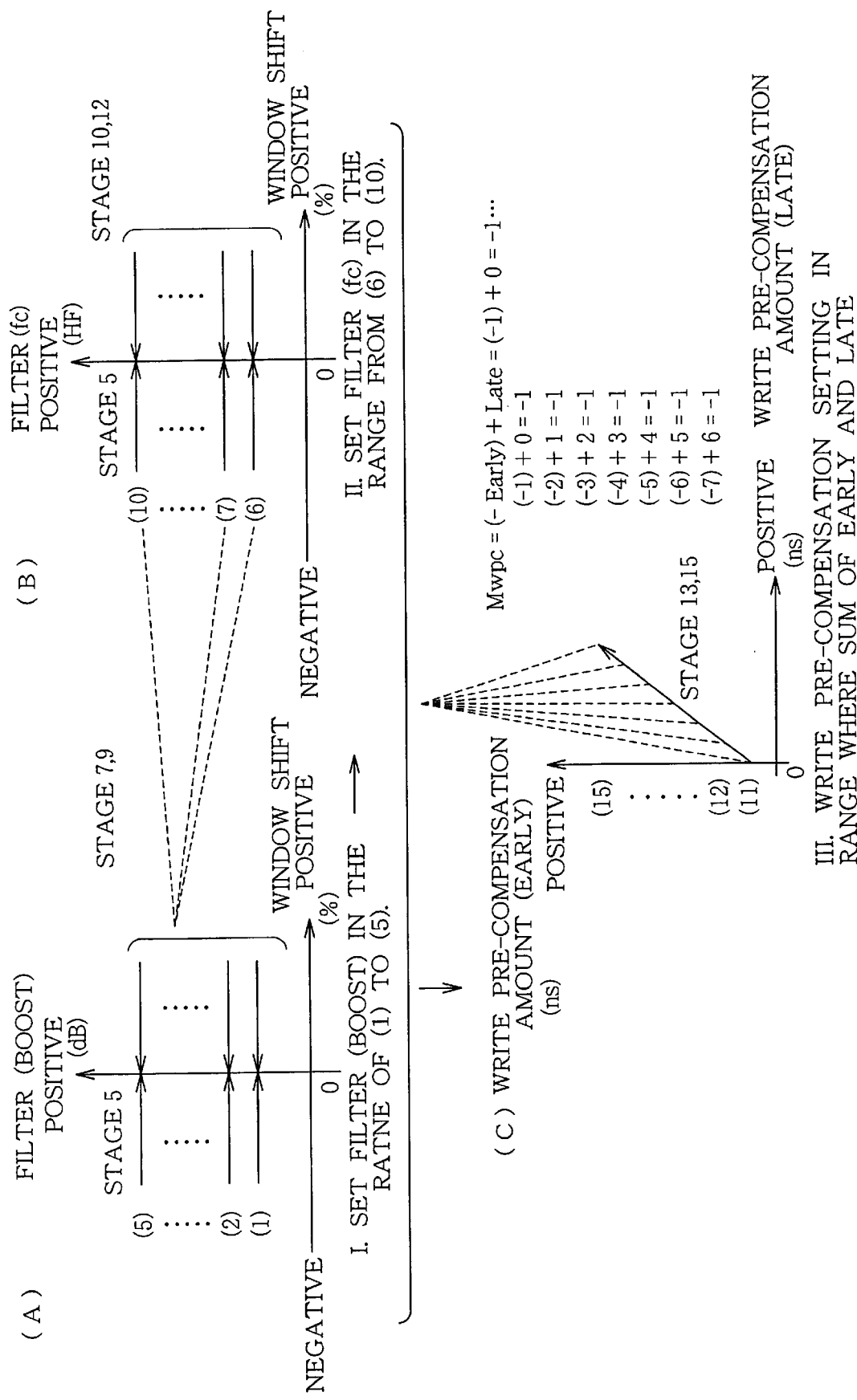

MAGNETIC DISC APPARATUS

BACKGROUND OF THE INVENTION

1. Field of the Invention

The present invention relates to a magnetic disc apparatus and in particular, to a magnetic disc apparatus for producing a pulse of a reproduction signal within a window.

2. Description of the Related Art

In a magnetic disc apparatus, a peak shift phenomenon can be seen. That is, a reproduction signal has a peak not stable and shifted. The range allowed for this peak shift is called a window margin, indicating the character of data read/write performance. In order to reduce the error rate indicating a bit mismatch between a recording signal and a reproduction signal, the window margin is adjusted in accordance with the performance of a magnetic disc medium. There have been suggested various methods to adjust this window margin according to a magnetic disc position or for respective heads.

For example, Japanese Patent Publication (unexamined) A3-95773 [1] discloses a method in which a multi-phase window is generated so as to select a window having an optimal phase difference with respect to a data signal.

Moreover, Japanese Patent Publication (unexamined) A9-180373 [2] filed by the same applicant as the present invention discloses a method of setting this window margin as follows. That is, a window position is shifted firstly in the plus direction and the minus direction, so as to determine error rates at the shifted positions. Next, a window margin is set according to the value of the error rate.

However, in the aforementioned conventional examples, the window position is modified at a constant interval and measurement is performed only once at each of the measurement points. Accordingly, when the same optimization is performed, there is a case that an optimal value is obtained at a position different from the previous optimization.

Especially, the inventor of the present invention has found in Document [2], that the window margin is not always maximum at the position where the parameter is optimal.

The inventor analyzed this problem and concluded that this problem is caused by the fact that each of the error rates for calculating the window margin (WDM) is measured only once at each window shift (WSF) point where the error rate easily fluctuates and that the optimization program including the window margin measurement is a procedure for varying one point in each parameter with an identical interval (step).

SUMMARY OF THE INVENTION

It is therefore an object of the present invention to provide a magnetic disc apparatus capable of reducing the error rate and obtain a preferable reproduction signal.

Another object of the present invention is to provide a magnetic disc apparatus capable of performing a window shift margin measurement with a higher accuracy and at a higher speed than in the conventional magnetic disc apparatus.

The magnetic disc apparatus according to the present invention comprises: a magnetic disc for recording a data; a reproduction head for reproducing a data recorded on the magnetic disc; and a signal processor for shaping a reproduction signal reproduced by the reproduction head and generating a pulse from the reproduction signal by using an optimized window.

The signal processor includes: (i) means for setting measurement points at an interval which is smaller in the vicinity of an initial position of a window than in the vicinity of the maximum modification position; (ii) means for shifting the window from the initial position up to the maximum modification position; (iii) means for reproducing a check data recorded on the magnetic disc so as to measure an error rate each time the window position is shifted according to the aforementioned interval; and (iv) means for using the error rate measurement results to obtain an optimal position of the window.

Thus, the region associated with the window margin position is checked accurately to obtain a high accuracy, while the region not affecting the optimization of the window margin position is checked roughly to reduce the time required for the check.

BRIEF DESCRIPTION OF THE DRAWINGS

FIG. 11A shows a processing at the Early side and FIG. 11B shows a processing at the Late side.

FIG. 15 explains in a layered expression the parameter modification procedure by the processing shown in FIG. 12 to FIG. 14. FIG. 15A shows a Boost setting, FIG. 15B shows an fc setting, and FIG. 15C shows a write pre-compensation setting.

DESCRIPTION OF THE PREFERRED EMBODIMENTS

Description will now be directed to embodiments of the present invention with reference to the attached drawings.

Figure 1:
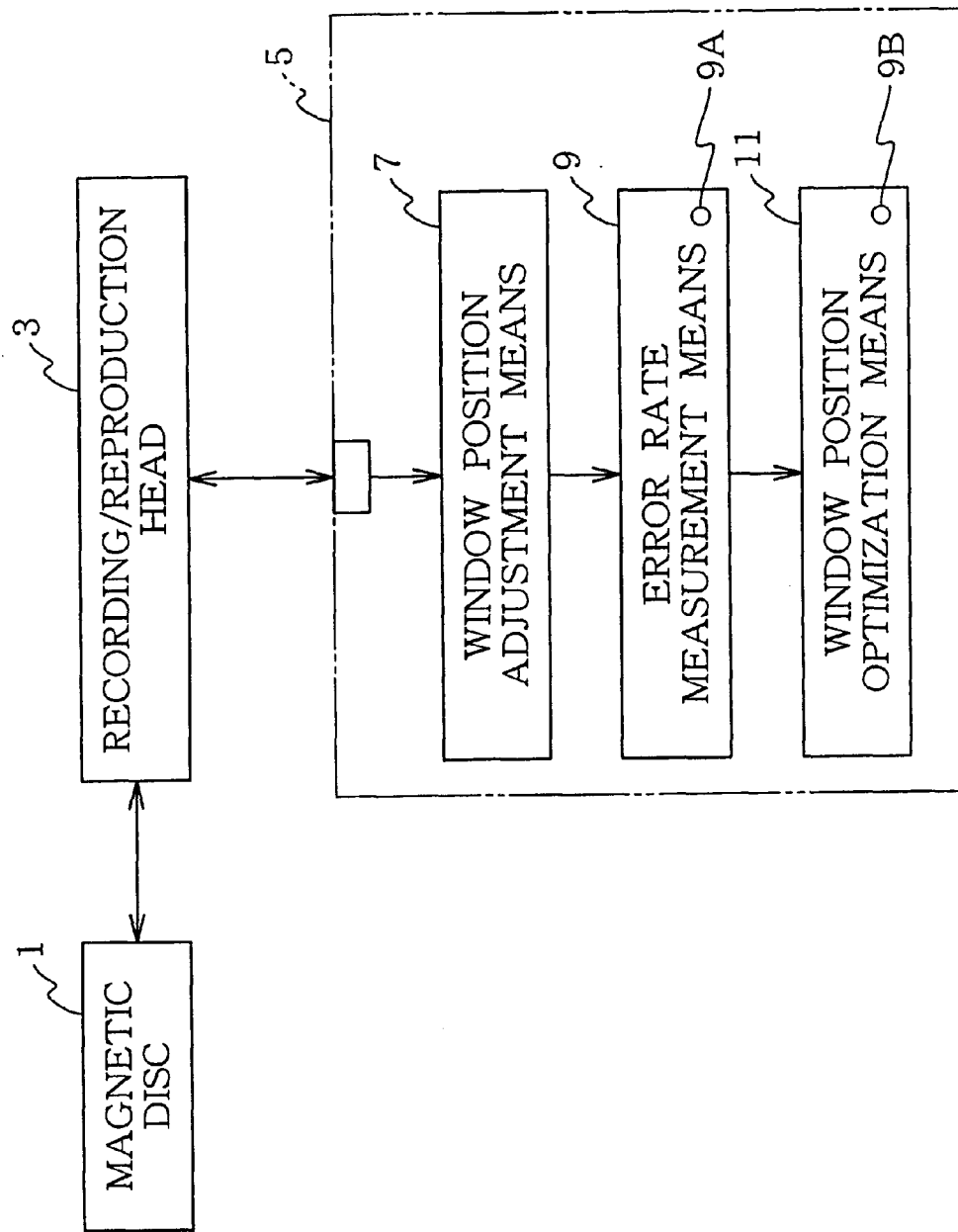
FIG. 1 is a functional block diagram schematically showing a configuration of a magnetic disc apparatus according to an embodiment of the present invention.

FIG. 1 is a functional block diagram schematically showing a configuration of a magnetic disc apparatus according to an embodiment of the present invention. The magnetic disc apparatus includes: a magnetic disc 1 for recording a data; a reproduction head (recording/reproduction head) 3 for reproducing the data recorded on a magnetic disc 1; and a signal processor 5 for shaping a reproduction signal reproduced by the reproduction head 3 and adjusting a recording signal. The signal processor 5 employs a window at an optimal position to produce a pulse from the reproduction signal.

The signal processor 5 includes: window position adjustment means 7 for varying the window position from a window initial position to a maximum modification position; error rate measurement means 9 for reproducing a check data recorded on the magnetic disc 1 and measuring an error rate for each time when the window position is adjusted by the window position adjustment mean 7; window position optimization means 11 for optimizing the window position according to a result of the measurement by the error rate measurement means 9.

Furthermore, in this embodiment, the window position adjustment means 11 has a measurement point setting function 9B for setting a plurality of measurement points nearer to the window initial position at a smaller interval than the measurement points nearer to the maximum modification position. Thus, in the vicinity of the window initial position, measurement is performed at a smaller interval (step). This assures to obtain a more preferable window setting. Furthermore, in the position far from the initial position, measurement is performed at a rough interval. That is, in the region having a large error rate and not required for optimization of the window position, the measurement can be completed in a short time.

In the present embodiment, this measurement point setting function preferably has: means for dividing the interval from the window initial position to the maximum modification position into a center region and a peripheral region at a predetermined ratio, and means for setting more measurement points in the center region than in the peripheral region. That is, in this example, two regions are set concerning the measurement interval (step). Moreover, it is also possible to change the measurement point interval in three or more stages.

When two measurement intervals are employed, the window position adjustment means sets twice more measurement points in the center region than in the peripheral region. This enables to set measurement points at a smaller interval in the region required for setting the window position. On the other hand, in the peripheral region, measurement points are set at a greater interval. Thus, it is possible to perform the window position setting at a high speed with a high accuracy.

Moreover, as shown in FIG. 1, it is preferable that the error rate measurement means 9 have an average value calculation function 9A for performing a plurality of measurements at each measurement point in the center region and calculating an average of the error rate for each measurement point. When the error rate measurement results are expressed in a graph, this function enables to obtain a smooth graph (hereinafter, referred to as a margin curve). If a window position is determined according to this margin curve, it is possible to set the window position with a high accuracy.

In order to create this margin curve and optimize the window width (window margin) and window position, it is preferable that the window position adjustment means 7 have an error rate plot function for plotting error rates at respective measurement points, from the window initial position to the left side and the right side. From two width values obtained as the two plot results by the error rate plot function, the width of the error rate set as a target error rate is determined to be a window width. This determination is performed by a window width determination function of the window optimization means 11, which also has a window position determination function for determining as a window position the position where that window width has been obtained.

The window position adjustment means preferably has an error rate-dependent measurement interval setting function for successively setting measurement points starting at the window initial position and modifying the setting interval according to results of error rate measurement performed in parallel to the measurement point setting. The measurement interval may be determined in relation to the error rate or the measurement interval may be increased when the error rate becomes greater than a predetermined error rate.

Figure 2:
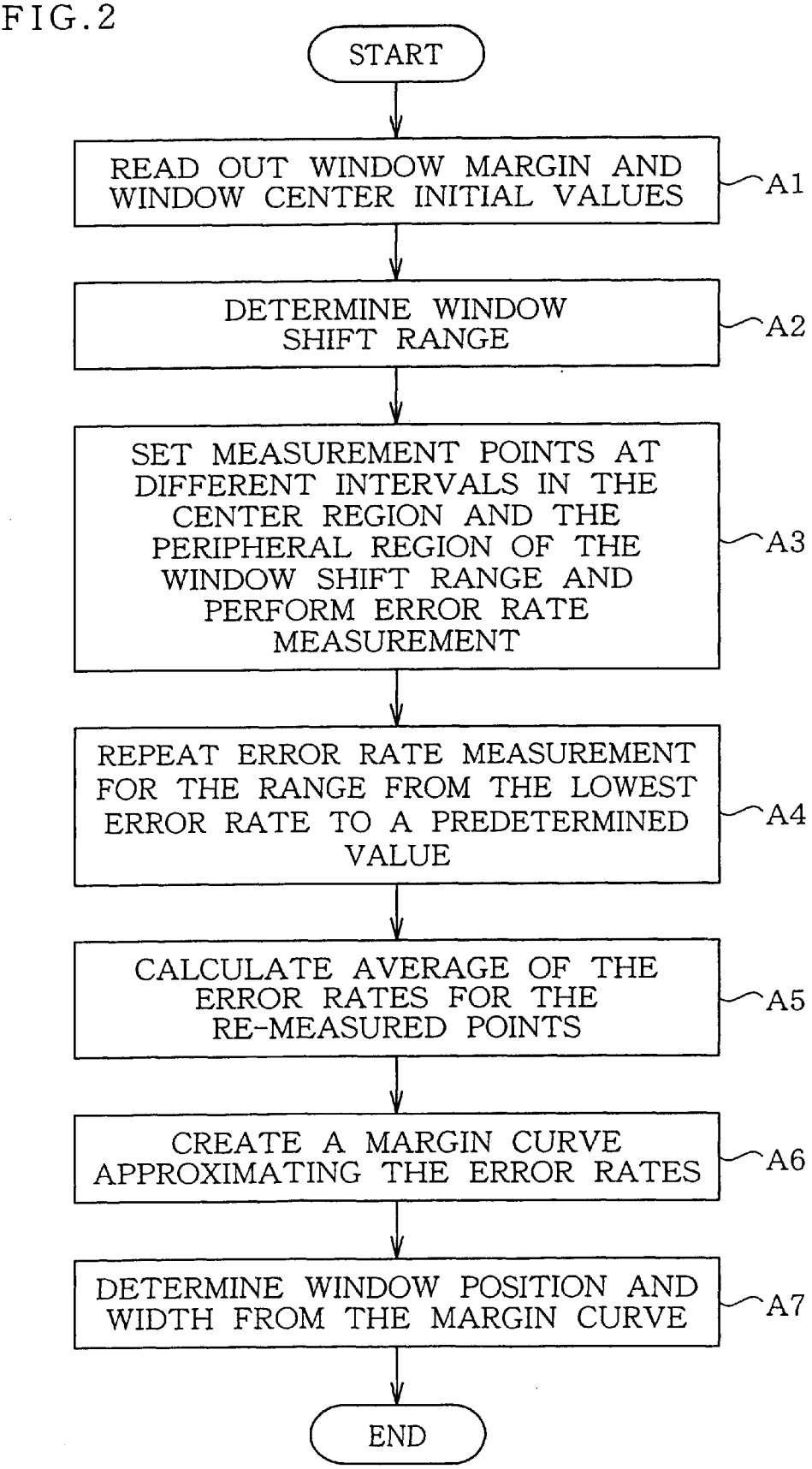
FIG. 2 is a flowchart showing an operation example of the configuration of FIG. 1.

Next, explanation will be given on the processing for creating a window curve and optimizing the window position and width, with reference to FIG. 2. Firstly, an initial value of the window width (window margin) and an initial value of the window center position (window center) are read out (stage A1). Next, a range for shifting the window is determined (stage A2). This is determined according to a data density and linear velocity for recording a data on the magnetic disc. Thus, the initial position and the maximum position for the window shifting are determined. Next, in this range for the window shifting, a measurement pointer is set (stage A3). Here, in this embodiment, the measurement interval is fine in the vicinity of the initial position and rough in the vicinity of the maximum position.

The window is shifted to each of the measurement points to measure the error rate (stage A4). Here, the window having the width of the initial value is moved in the track direction according the measurement interval and the error rate is measured at each of the measurement points. In this case, one end of the window is at one measurement point and the other end of the window is at another measurement point.

Furthermore, for the point where the error rate is greatly changed, it is preferable to calculate an average value. For this, measurement points are extracted between a measurement point having the lowest error rate and a measurement point having a predetermined error rate, so that their error rates are again measured. Thus, a plurality of measurement results for the respective points are used to calculate the average value (stage A5).

Figure 6:
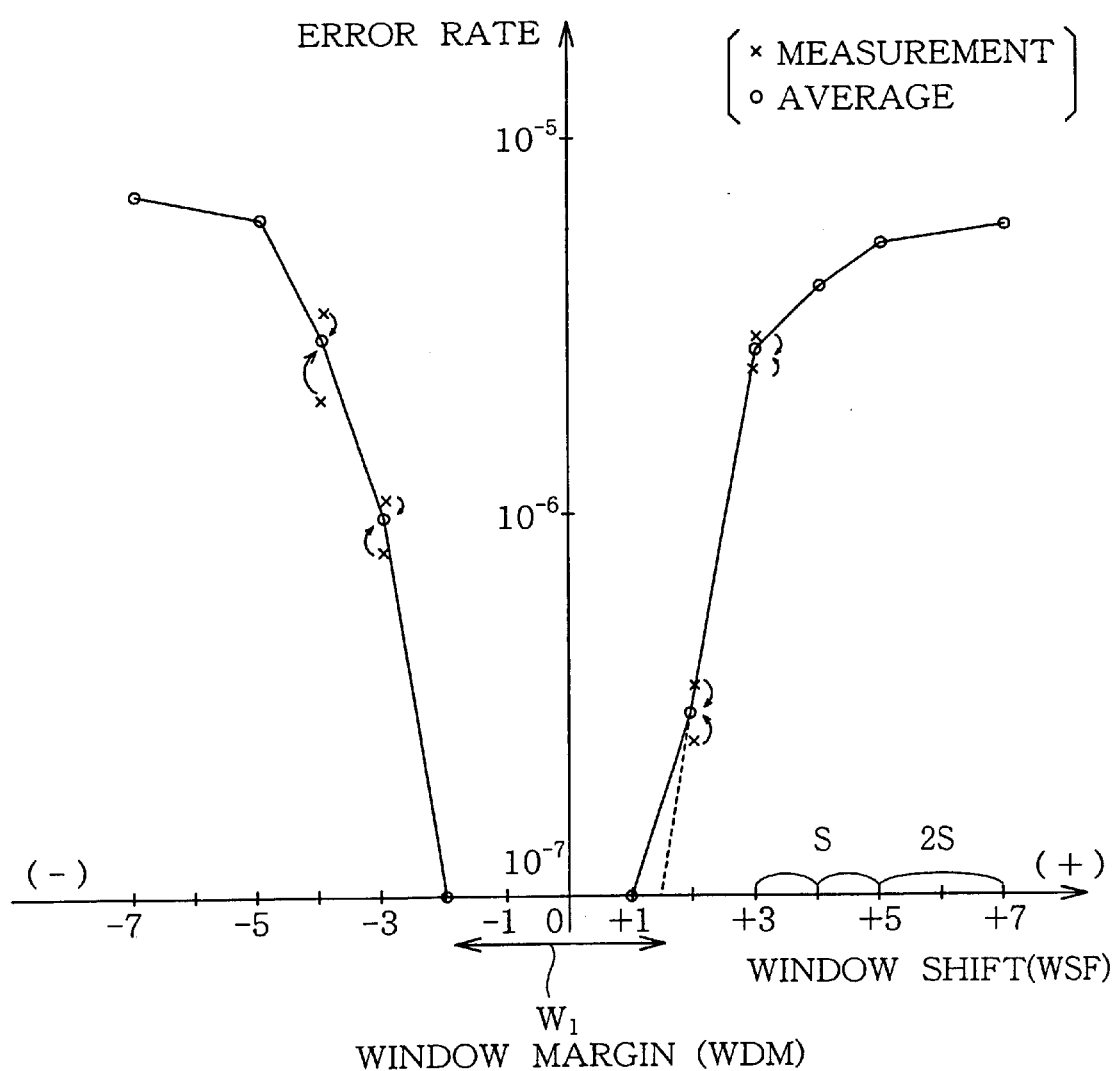
FIG. 6 is a graph showing an example of margin curve obtained by the processing shown in FIG. 2 or FIG. 5 (Calculating method of present invention).

Next, a margin curve is created. The margin curve will be detailed later in Examples. FIG. 6 shows an example of the margin curve. Here, the horizontal axis represents a window position and the vertical axis represents an error rate. By performing measurement at a small interval in the vicinity of the initial position and calculating an average value, it is possible to obtain a margin curve of a conical shape as shown in FIG. 6. According to this margin curve, for example, if an error rate of $10^{-7}$ is required, the window position is determined so as to have a width from −2 to +1. If the error rate of $10^{-6}$ is sufficient, the range from −3 to +2.5 is used. Here, in FIG. 6, the error rate intersected by the horizontal axis is 0. That is, when the window margin is in the range from −2 to +1, the error rate is 0. Accordingly, it is possible to use as the margin curve the section connecting the measurement result at +2 and the measurement result at +3 (as shown by a dotted line in FIG. 6). Thus, the window margin satisfying the error rate equal to or below $10^{-7}$ is obtained as the range indicated by W1 in FIG. 6.

Thus, according to the present embodiment, measurement points are set at a fine interval in the vicinity of the window initial value and an average value is calculated for a measurement point having a large error rate change. This enables to obtain a margin curve of a conical shape, which enables to obtain a stable optimization of the window width and position.

EXAMPLE

Next, explanation will be given on an example of the present invention with reference to the attached drawings.

Figure 3:
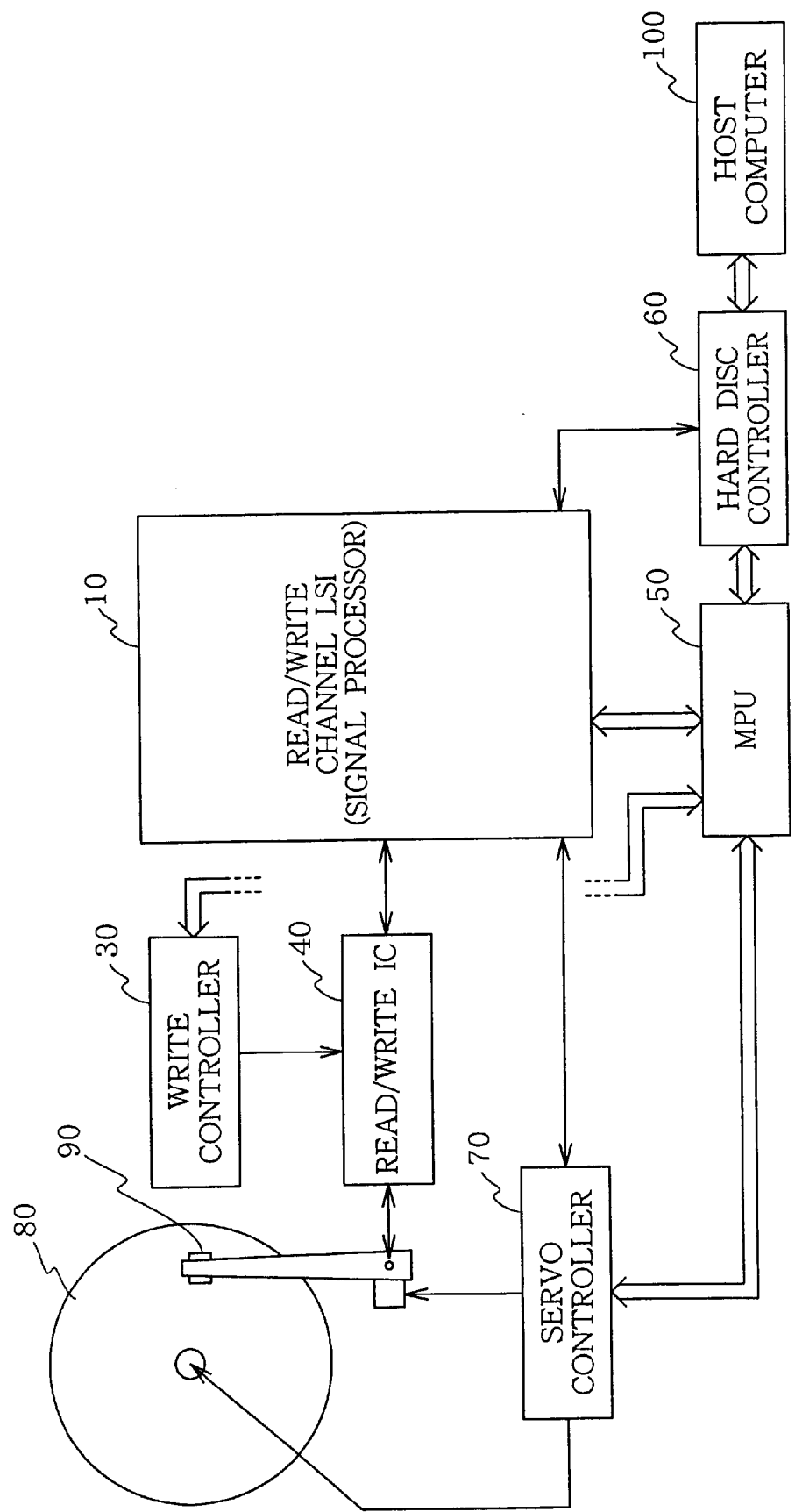
FIG. 3 is a block diagram showing a configuration of hardware resources of the magnetic disc apparatus of FIG. 1.

FIG. 3 is a block diagram showing a configuration of hardware resources of the magnetic disc apparatus according to the present invention. As shown in FIG. 3, the magnetic disc apparatus includes: a magnetic disc 80; a recording/reproduction head 90; a servo controller 70 for controlling rotation of the magnetic disc 80 and positioning of the recording/reproduction head 90; and a read/write IC (chip) 40 for controlling output of a write current (Ic) for recording a data (recording pulse) on the recording/reproduction head and creating a magnetization reversed pulse according to a data read out from a medium. The magnetic disc 80 is driven to rotate by a spindle motor.

The magnetic disc apparatus further includes: an R/W channel LSI 10 as a signal processor; a microprocessor (MPU) 50 for controlling the magnetic disc apparatus; and a hard disc controller (HDC) 60 for input/output of instructions and data which are output from a host computer 100.

The magnetic disc may employ any of the conventional servo methods, zone setting, and zone allocation on the magnetic disc. In case of a magnetic disc apparatus where a linear velocity is changed for a plurality of zones are set in the inner region and the outer region of the disc, the window setting is preferably optimized for each of the zones. Moreover, it is also possible to employ the same optimization of the window in the radial direction of the disc.

Figure 4:
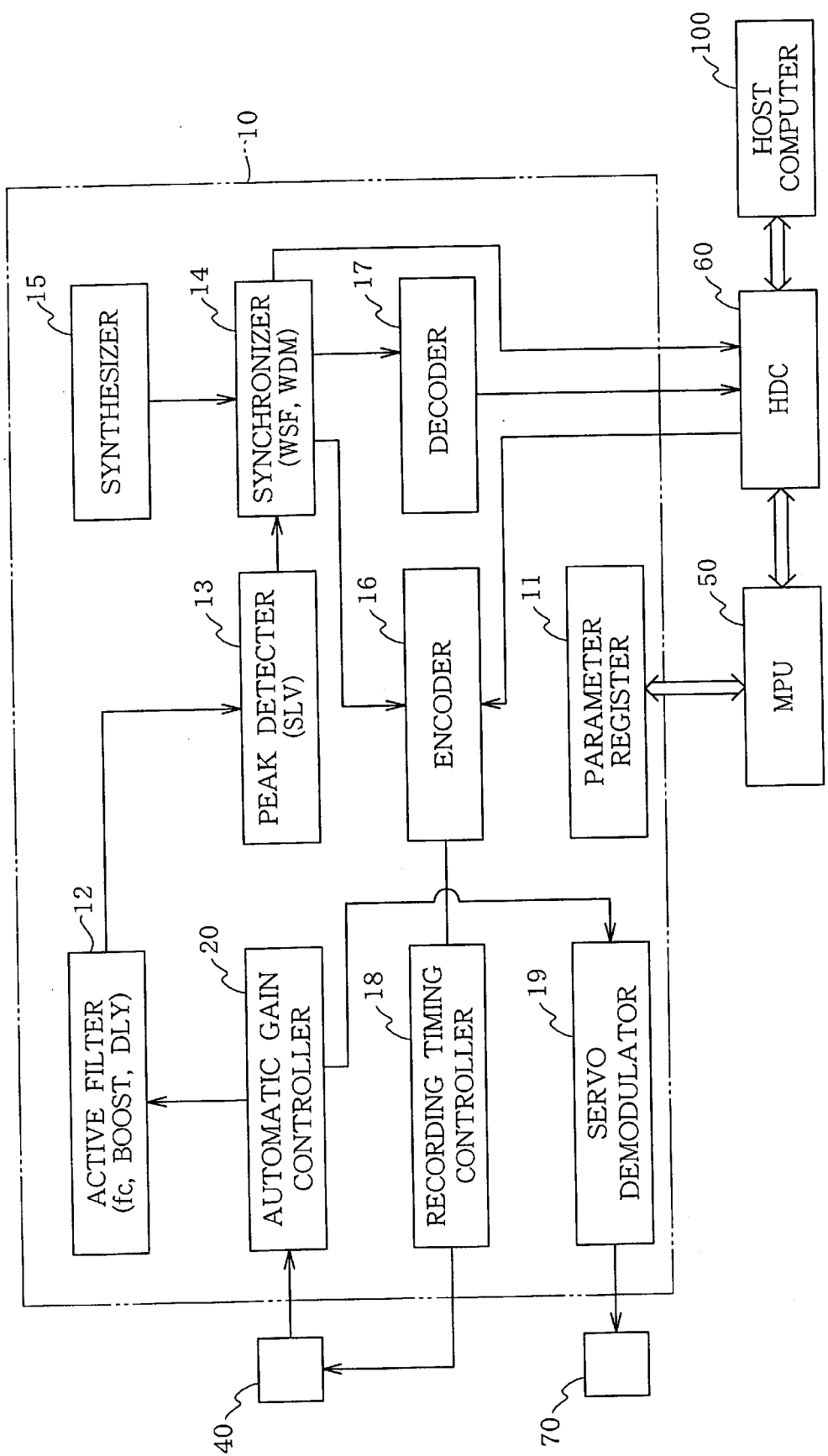
FIG. 4 is a block diagram showing a detailed configuration of a signal processor shown in FIG. 3.

FIG. 4 shows a detailed configuration of the R/W channel LSI including: a parameter register 11 for setting parameters for respective blocks; an active filter (FLT) 12 for shaping a reproduction signal waveform; a peak detector (SLV-CTL) for controlling the reproduction signal slice level (threshold value for producing a pulse); and a data synchronizer (DT-SYC) 14 for controlling the window width and position to define a range for producing a pulse.

Moreover, the R/W channel LSI includes: a synthesizer (TBG) for creating a write PLO clock; an encoder (ENC) 16 for converting a data from the hard disc controller (HDC) into a recording code; a decoder (DEC) 17 for converting the recording code into a data; and a write pre-compensation (WPC) 18 for controlling timing when the write pulse is changed according to the recording code pattern.

Furthermore, the R/W channel LSI (RWC 10) includes: a servo demodulator (SC-DEM) for detecting an information for head positioning on the disc medium surface; and an automatic gain apparatus (AGC) 20 for stabilizing the amplitude value of the read out signal supplied from the RWC 10.

In this example, the window position adjustment means 7, the error rate measurement means 9, and the window position optimization means 11 shown in FIG. 1 are realized as circuits such as the data synchronizer and control by the MPU. Distribution of the functions between the LSI and the MPU with a program may be designed or modified depending on the type of the magnetic disc apparatus.

Figure 5:
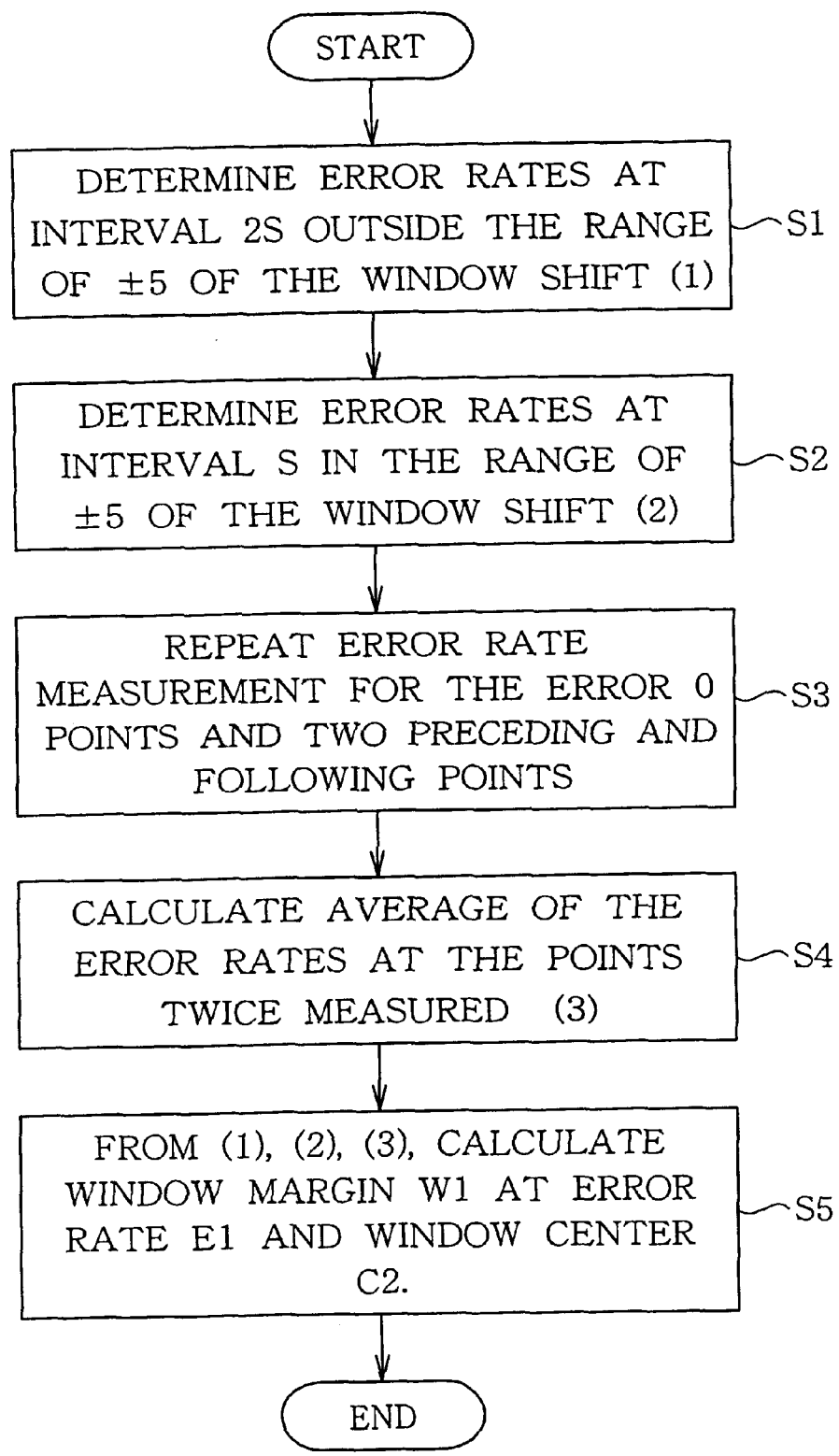
FIG. 5 is a block diagram showing an example of a window position and width optimization by the configuration shown in FIG. 3.

FIG. 5 is a flowchart showing an example of processing for optimizing the window position and width. Here, the window is shifted in the range from −10 to +10.

FIG. 6 shows a range from −7 to +7. Firstly, outside the range of ±5 from the center, the error rate is measured at a double step width 2S (stage S1). That is, measurement points far from the window center SO are set at a greater interval than the normal step width. This enables to reduce the number of measurements which do not have a significant effect for the margin calculation.

Next, within in the window shift range of ±5, the error rate is measured at the normal interval, i.e., step S (stage S2). When the error has become zero, the error rate measurement is terminated both in the plus side and the minus side.

Next, the error rate measurement is again performed at the points where zero has been obtained and at two points below and above zero points, i.e., both in the plus direction and minus direction (stage S3). Thus, three points are selected both in the plus direction and minus direction as the points which directly affect the margin calculation.

Referring to FIG. 6, in the minus direction, the point −2 where the error rate has become zero and the two preceding points −3 and −4 are selected as the three points for re-measurement. In the plus direction, the point +1 where the error rate has become zero and the two following points +2 and +3 are selected as the three points for the re-measurement.

The re-measurement is performed once in this embodiment but may also be performed more than once. Moreover, the calculation of the average error rate value may be based on the two points preceding and following the error zero points or on all the points reaching the upper limit.

Next, for the points where the re-measurement has been performed, the measurement results obtained in the first measurement and the re-measurement are used to obtain an average error rate (stage S4).

Furthermore, a margin curve is created as shown in FIG. 6, so as to set a window margin according to a predetermined error rate. That is, if the error rate is $10^{-7}$, the window margin is set as a range between −2 and +1.5 as shown in FIG. 6.

Figure 7:
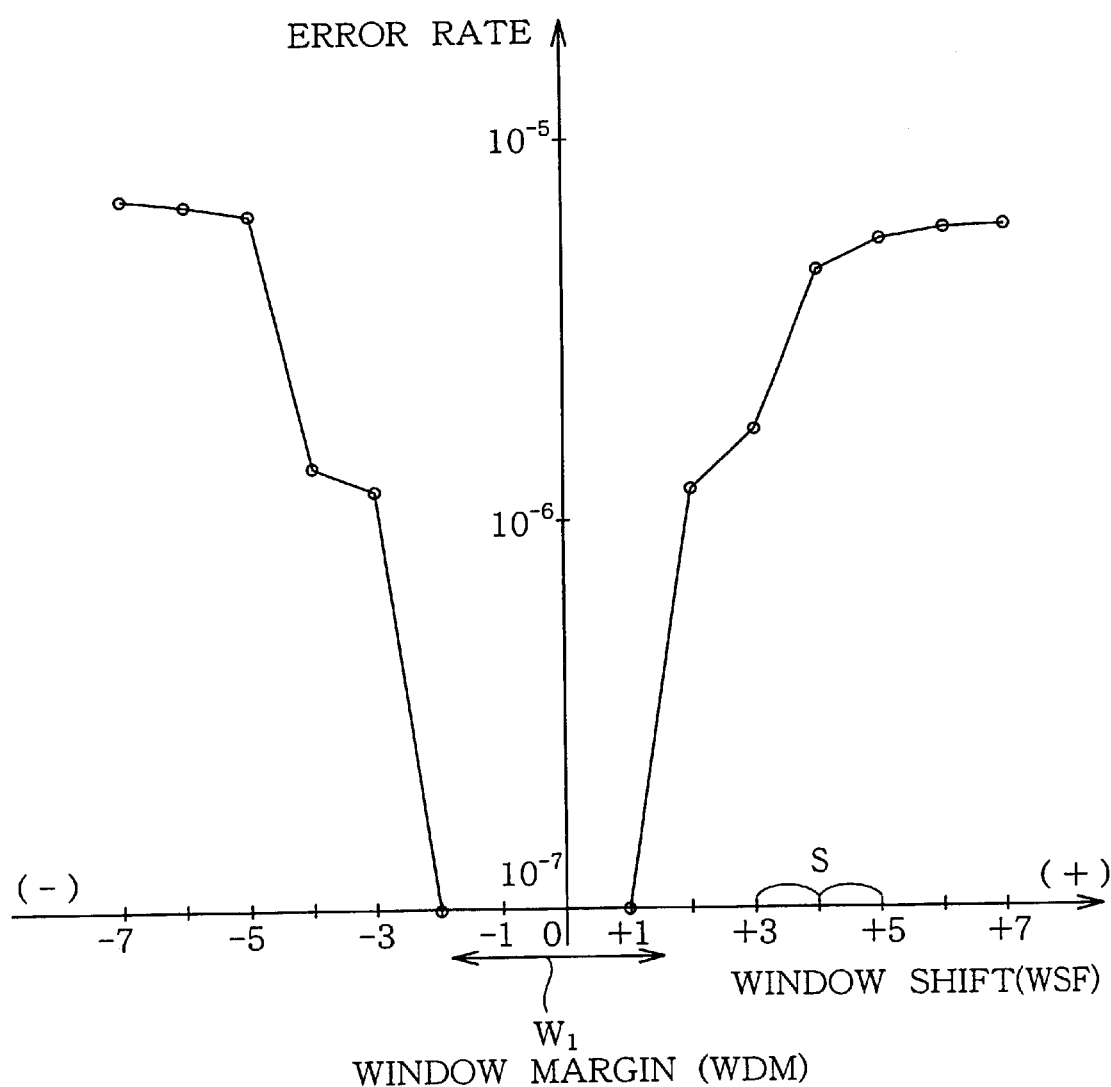
FIG. 7 is a graph showing another example of margin curve obtained when performing no measurement position adjustment or no average value calculation (Calculating method of prior art).

FIG. 7 shows a margin curve obtained by the conventional method. When compared to this margin curve of the conventional method, the margin curve of FIG. 6 is more smooth, enabling to calculate a window margin with a higher accuracy.

Figure 8:
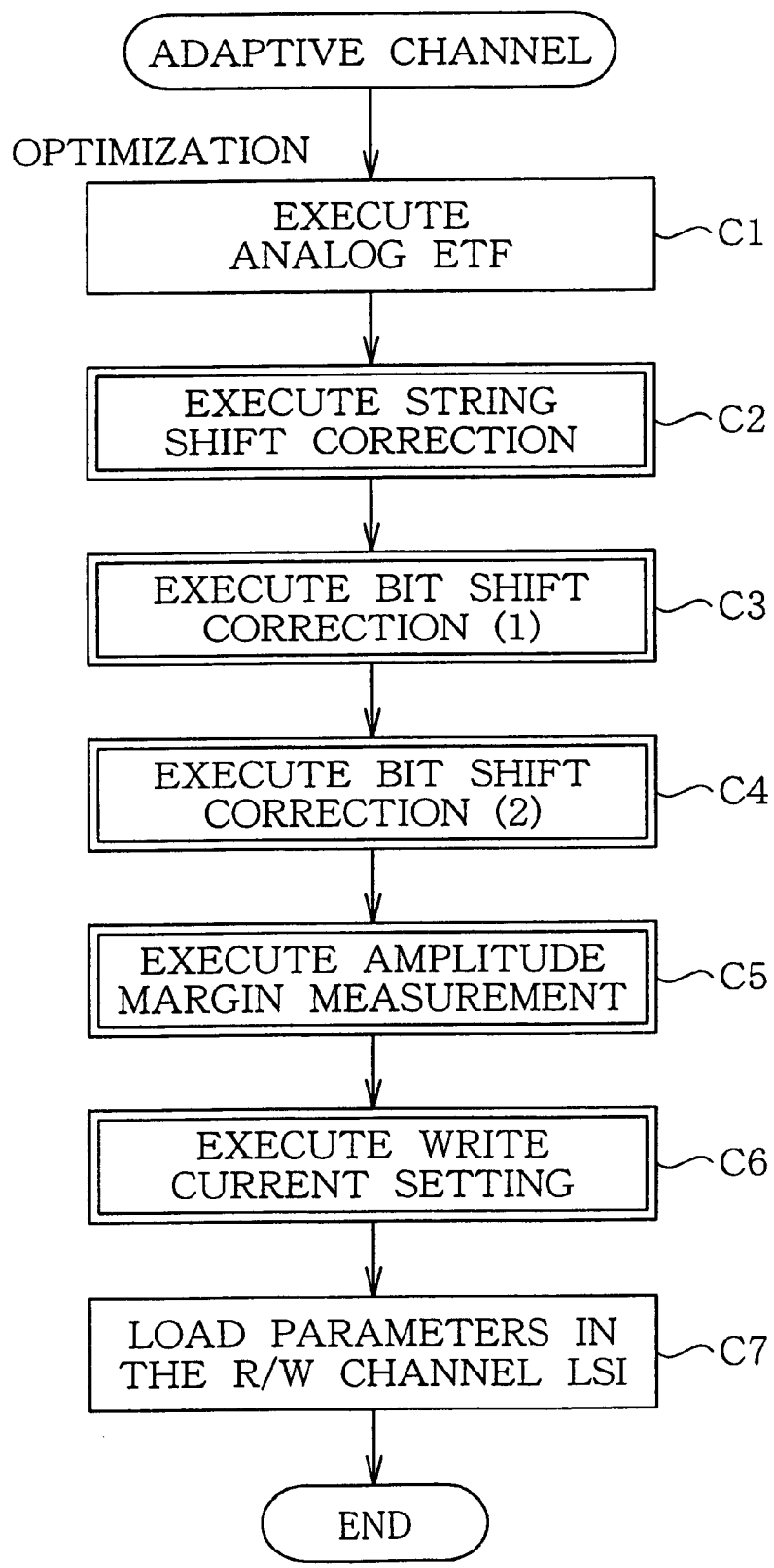
FIG. 8 is a flowchart showing a parameter setting procedure according to an embodiment of the present invention.

FIG. 8 is a flowchart showing a parameter setting procedure by the R/W channel LSI (signal processor) according to the present embodiment. Firstly, an analog ETE is executed (C1). This step determines a cylinder for which the window margin and the amplitude margin are to be calculated for setting the R/W LSI parameter setting. After this, a string shift is performed (C2). Here, a group ready setting condition is selected.

Next, a bit shift correction (1) is performed (C3) o as to select (temporary setting) of a setting condition of a write pre-compensation (Early, Late). Furthermore, a bit shift correction (2) is performed (C4) Here, the temporary setting of C3 is used to select a setting condition of the filter (fc, Boost) and write pre-compensation.

Furthermore, the amplitude margin is measured (C5). Here, the slice level and the filter (fc, Boost setting condition is selected. Furthermore, the write current setting is performed (C6). The parameters selected in steps C2 to C6 are loaded (C7).

Figure 9:
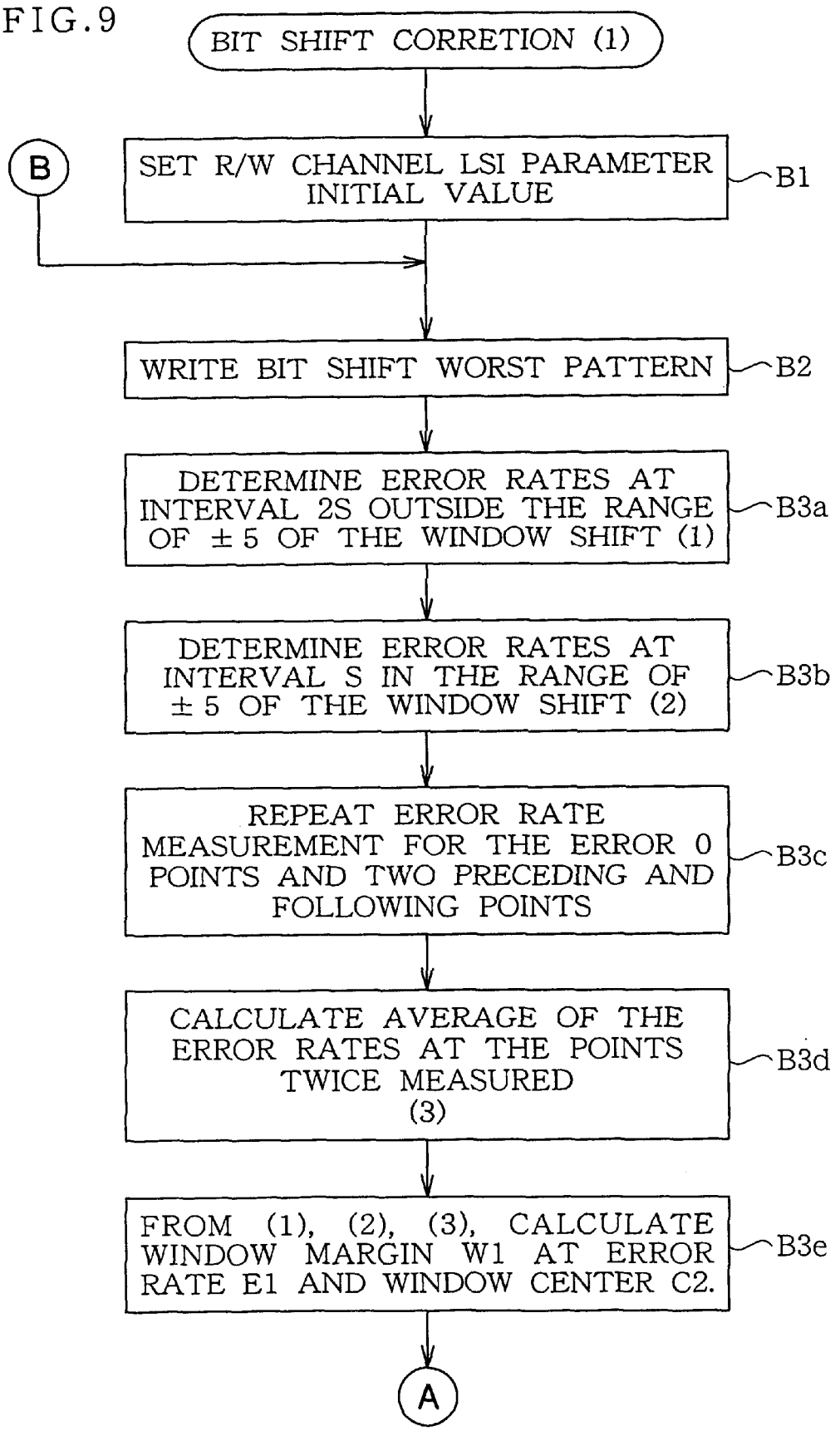
FIG. 9 is a flowchart showing a former stage of a detailed processing of the bit shift correction (1) shown in FIG. 8.
Figure 10:
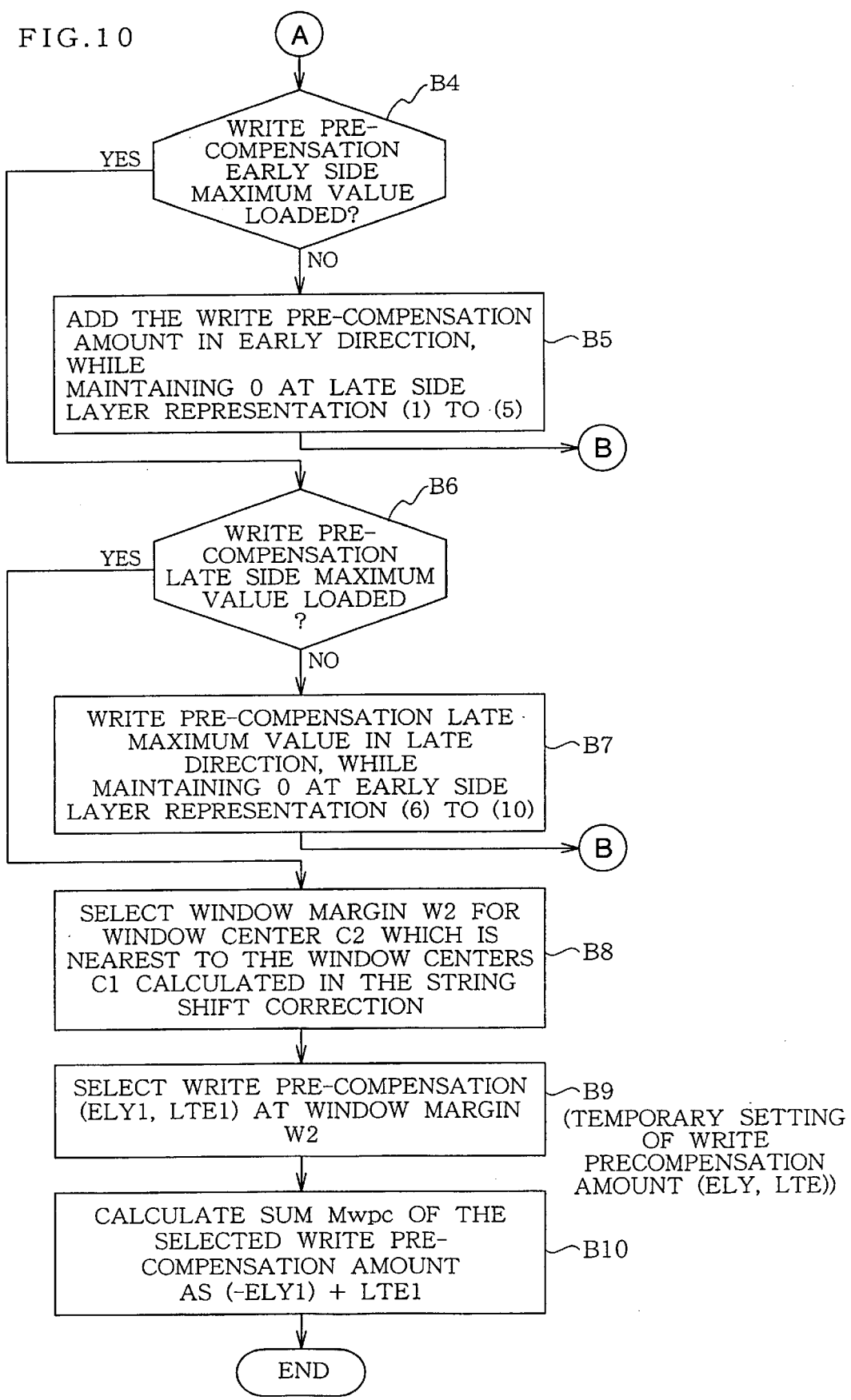
FIG. 10 is a flowchart showing a latter stage of a detailed processing of the bit shift correction (1) shown in FIG. 8.

FIG. 9 and FIG. 10 are a flowchart showing a procedure to obtain a condition for Early direction addition and Late direction addition of write pre-compensation amounts. Note that FIG. 9 is continuous to FIG. 10 at symbols A and B.

In the bit shift correction (1), firstly, the LSI is initialized (Bl). The group ready (GDLY) is set It is assumed that the slice level and the filter (fc, Boost) are at their center values, the write current is set to its minimum value, the write pre-compensation is 0. These values are stored in the parameter register 11 shown in FIG. 4.

Next, a bit shift worst pattern is written on the magnetic disc 80 (B2). Here, the worst pattern is a 3T pattern followed by a continuous two-bit pattern having different bit intervals. The worst pattern is written while changing only the Early side or Late side of the setting of the write pre-compensation (WPC) 18. This worst pattern is recorded and reproduced so as to optimize the window width and position allowing fluctuation of the reproduction signal peak position. It is also possible that this worst pattern is recorded on a part of the magnetic disc in advance.

Next, the window margin at the target error rate E1 is determined to calculate the center value C2 (B3a to B3e). In FIG. 6, the cross "x" indicates error rates obtained in the first and the second measurements, whereas the circle "o" indicates the average of the error rates of the first and the second measurements at measurement points −2, −3, −4 and +1, +2, +3. At points −2 and −1, no error occurred (error rate e1). According to the error rate obtained at the second time or the averaged error rate, the window margin W3 at the error rate E1 is calculated Next, for the write pre-compensation (WPC), Early-direction maximum check (B4) and Early direction addition (B5) are performed by determining a window margin when addition is performed in the Early direction. Here, the Late side remains to be 0. When the maximum setting is obtained in the Late direction, a window margin W2 is selected which is nearest to the window center calculated by the string shift correction.

Figure 11:
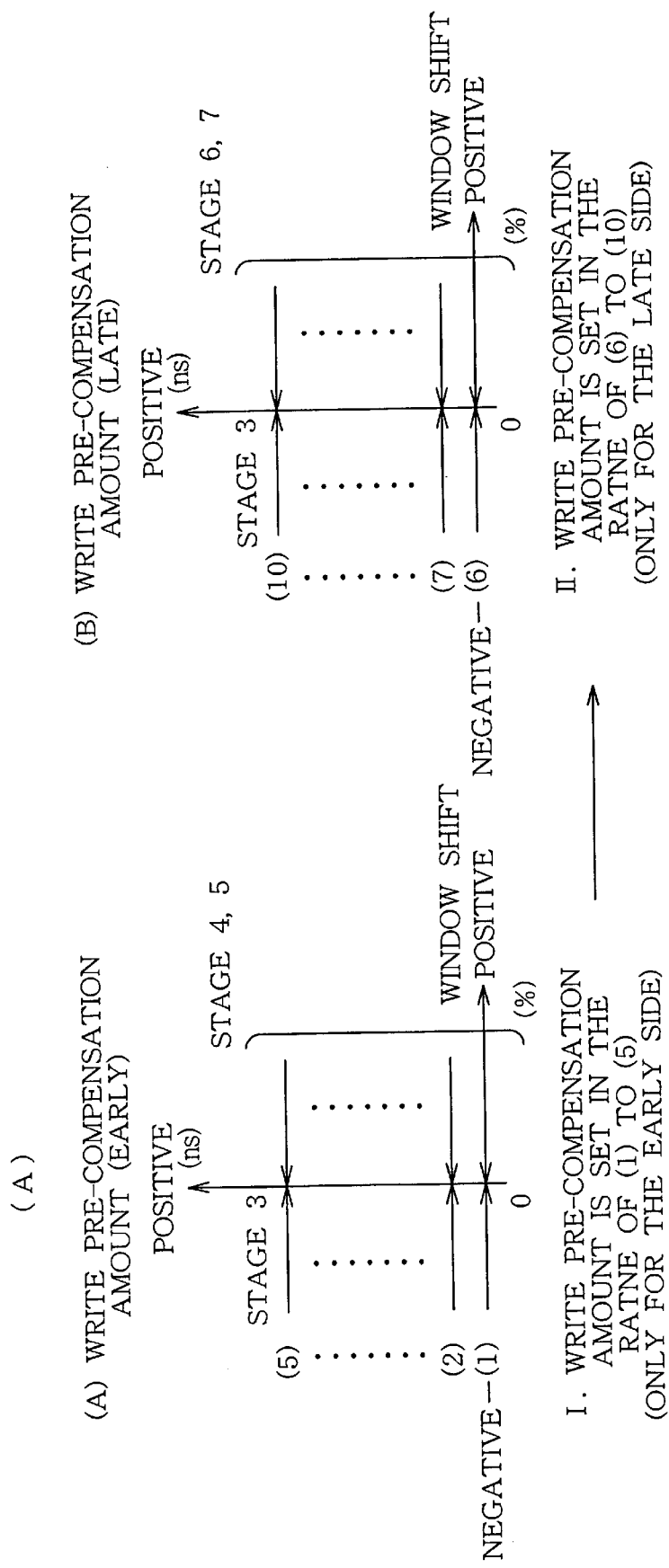
FIG. 11 explains in a layered expression the parameter modification procedure by the processing shown in FIG. 9 and FIG. 10.

The window margin selection step (B9) selects the WPC setting condition (ELY1, LTE1) when the window margin is W2. Finally, WPC addition is performed (B10), assuming the Early side as a negative value as follows: (−ELY1)+ LTE1=Mwpc. FIG. 11 shows this write pre-compensation amount in a layered form.

Figure 12:
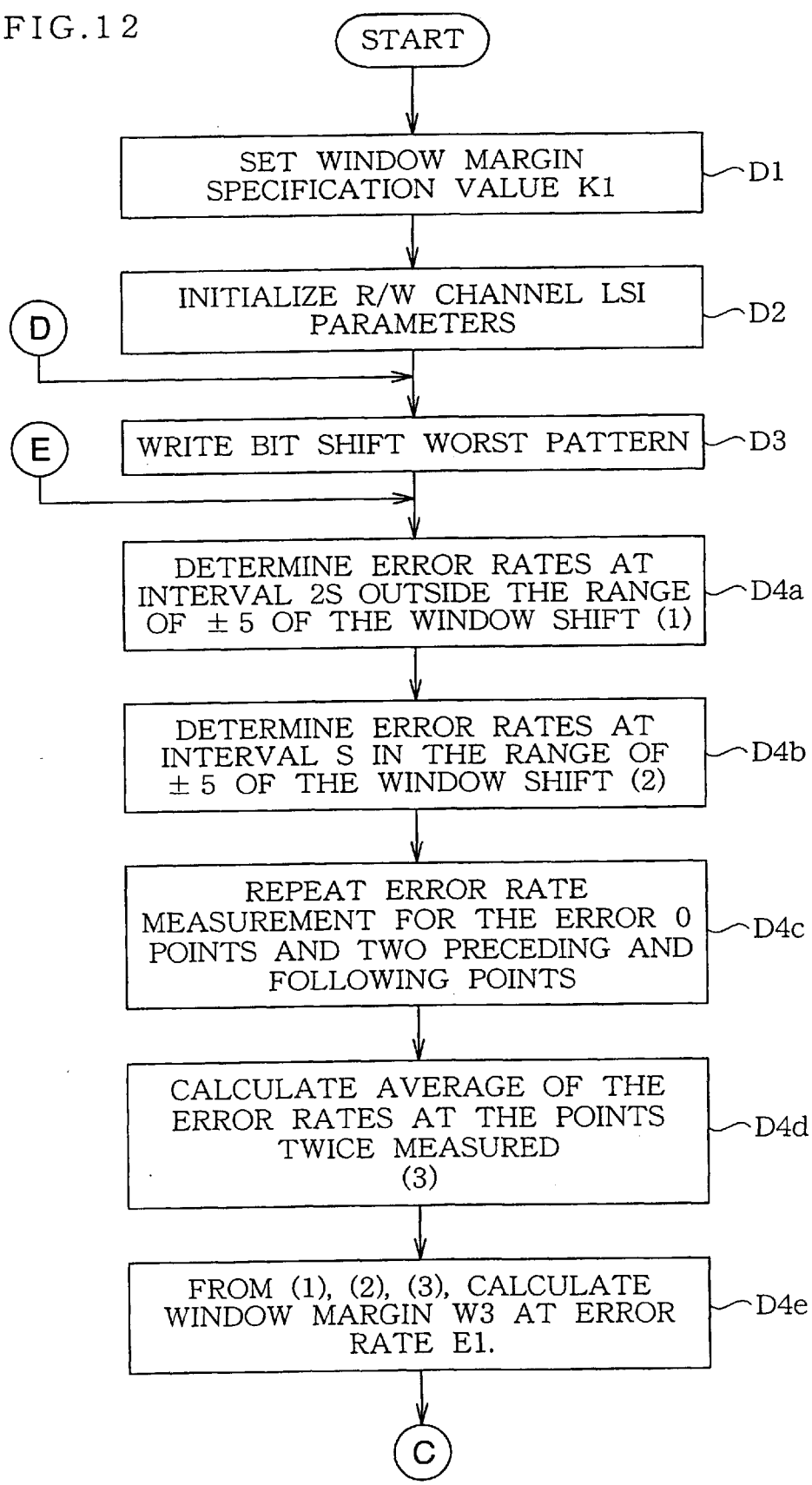
FIG. 12 is a flowchart showing a former stage of a detailed processing of the bit shift correction (2) shown in FIG. 8.
Figure 13:
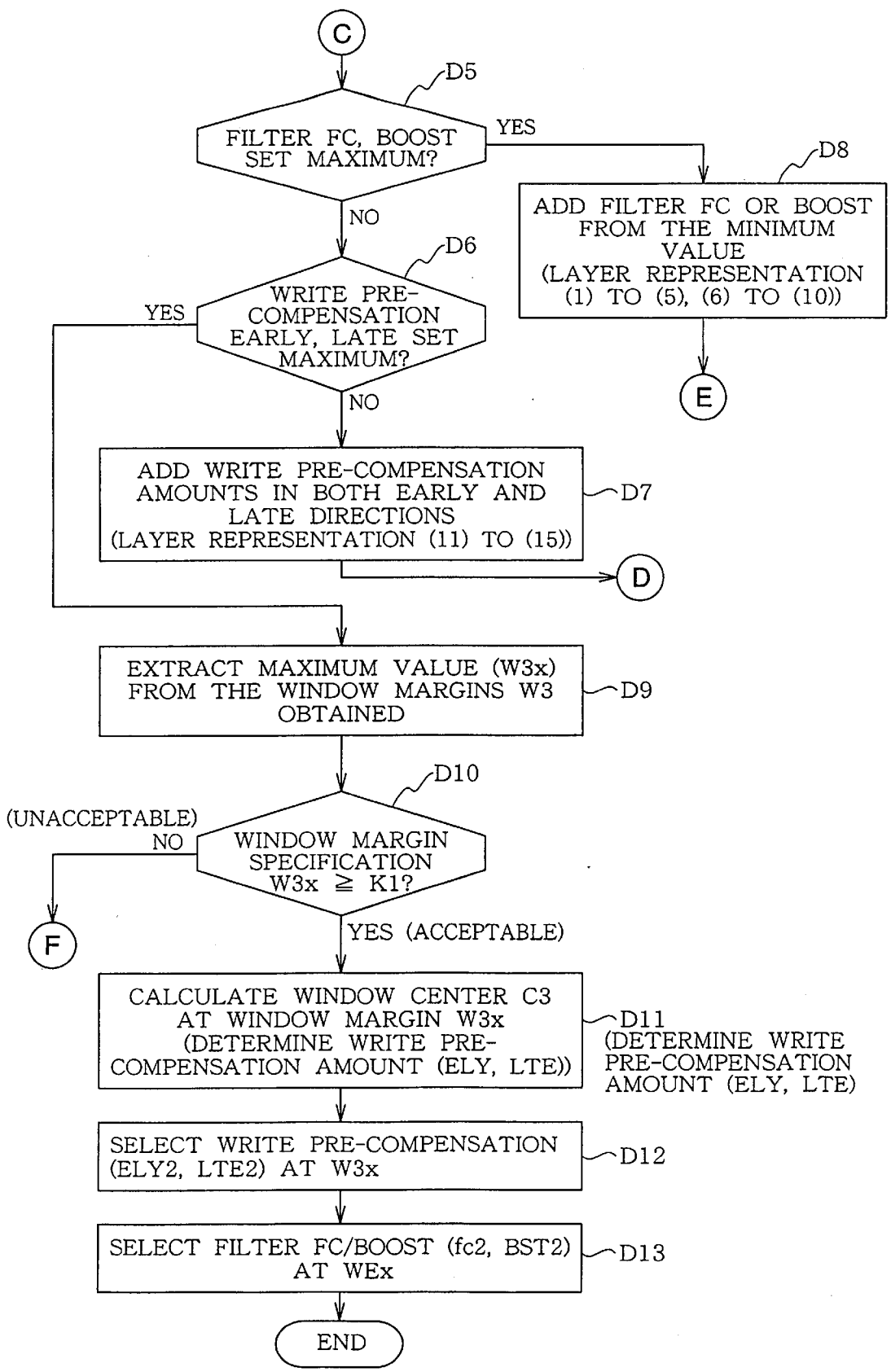
FIG. 13 is a flowchart showing an intermediate stage of a detailed processing of the bit shift correction (2) shown in FIG. 8.
Figure 14:
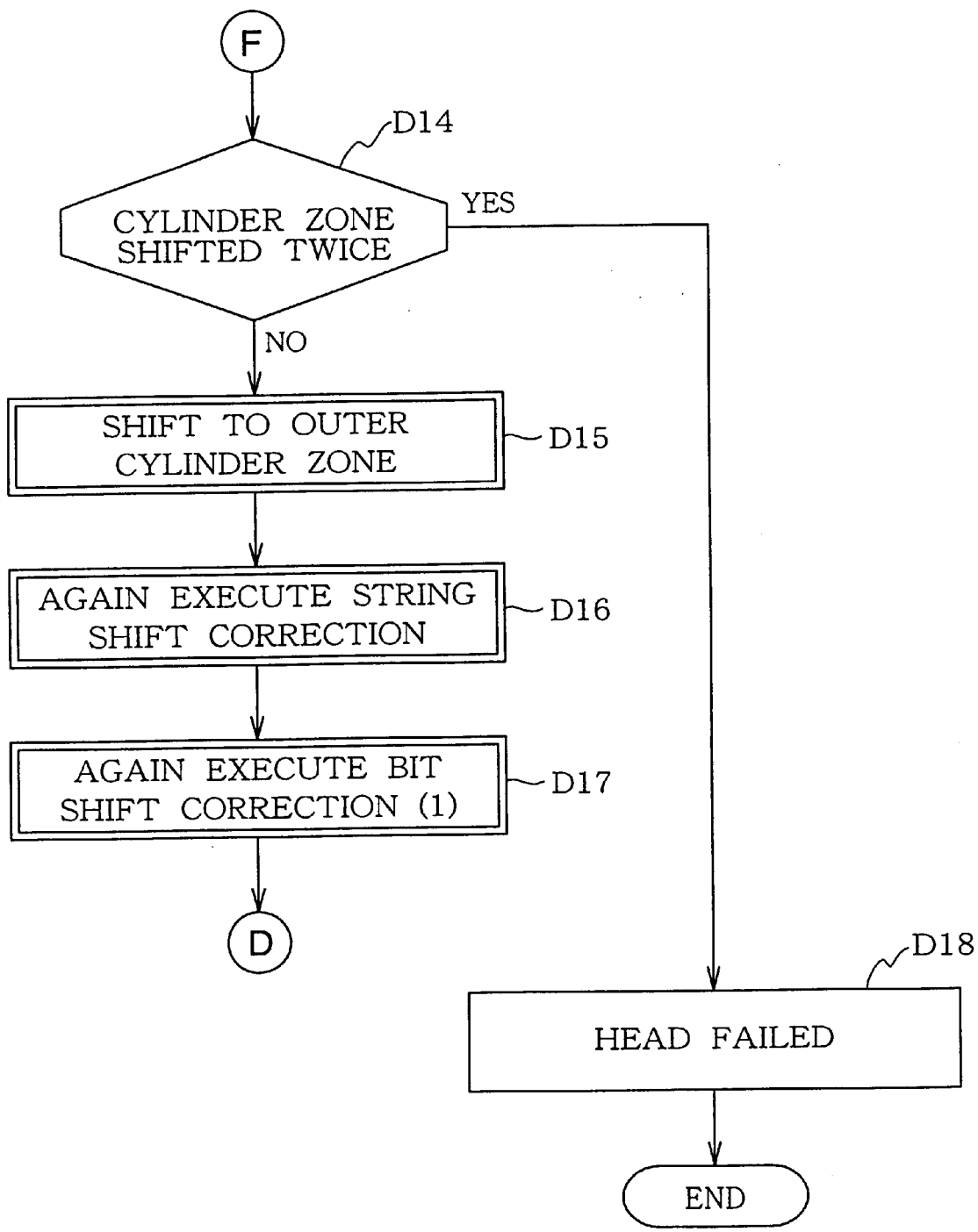
FIG. 14 is a flowchart showing a latter stage of a detailed processing of the bit shift correction (2) shown in FIG. 8.

FIG. 12 to FIG. 14 are a flowchart showing a processing of the bit shift correction (2) for retrieving a filter fc/Boost setting condition according to the group ready value and the write pre-compensation value. Note that FIG. 12. FIG. 13, and FIG. 14 are continuous at points C, D, E, and F.

In the bit shift correction (2) C4, firstly, the step S1 for the window margin specification setting determines a reference to accept or not accept a check result. In the LSI initialization S2, the GDLY and WPC values (G1, ELY1, LTE1) selected and calculated in step C3 is loaded in the parameter register 11. The bit shift worst pattern write D3 prepares a write pattern identical to the one used in the bit shift correction (1), and the WPC18 setting is written onto the magnetic disc.

In the margin measurement/center calculation (D4a to D4e), the window margin at the error rate E1 is determined to calculate the margin width W3. The filter (fc/Boost) maximum check D5 uses an addition (D8) loop from the fc or Boost minimum value to determine the window margin in the range of the fc/Boost.

The write pre-compensation (WPC) is performed as an Early direction maximum check (D) and an Early/Late direction addition (D7), where the Early/Late direction addition is performed without changing the sum wpc of the Early and Late of the WPC calculated in the bit shift correction (1). Here, for the WPC setting, the window margin is determined in the range of the fc/Boost setting. Step D9 extracts a maximum window margin (W3x) in the entire range of the WPC, FLT, and fc/Boost. Step S10 performs a window margin specification evaluation by comparing the W3x with a window margin specification value (K1). If the W3x is equal to or greater than K1, the window margin is accepted. Otherwise, the window margin is not accepted.

When the window margin is decided to be acceptable, step D11 performs a window center calculation to determine the center value C3 of the window margin W3x. Step D12 then selects a WPC at w3x by selecting ELY2 and LTE2 for the Early and Late, respectively. After this, in step D13 for filter selection for W3x, the fc and Boost select fc2 and BST2, respectively, passing control to the next chapter (C5).

On the other hand, when the window margin is decided to be unacceptable, control is passed to step S14 for retry check. If the retry fails twice, i.e., if the retry fails after a cylinder zone is shifted twice, step S18 decides that the head has failed, terminating the parameter setting operation.

In the first session of the flowchart, step D15 for cylinder zone shift, the object zone is shifted to an outer cylinder zone having the other parameters unchanged, where the string shift correction retry D16 and the bit shift correction (1) retry D17 are performed. Then, control is returned to D3. Note that FIG. 15 schematically shows the parameter modification procedure of FIG. 12 to FIG. 15.

As has thus far been described, in the present example, for the region significantly affecting the margin calculation, the measurement points are set at a smaller interval than in the region not affecting the margin calculation. That is, in the conventional measurement program, measurements points are set at an identical interval between the maximum and the minimum values so that the error rate measurement is performed once at each of the points, whereas in the present example the error rate measurement is performed twice or more for a window shift points that significantly affects the window margin width, so as to obtain an average value. This reduces the measurement fluctuation and enables to effectively and accurately estimate the point where the window margin is at a maximum value.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-071819 (Filed on Mar. $20^{th}$, 1998) including specification, claims, drawings and summary are incorporated herein by reference in its entirety.

What is claimed is:

1. A magnetic disc apparatus comprising:
   a reproduction head for reproducing a data recorded on a magnetic disc; and
   a signal processor for shaping a reproduction signal reproduced by the reproduction head and generating a pulse from the reproduction signal by using an optimized window, the signal processor having functions of
- (i) setting measurement points at an interval which is smaller in the vicinity of an initial position of a window than in the vicinity of a maximum modification position;
- (ii) shifting the window from the initial position up to the maximum modification position;
- (iii) each time the window position is shifted according to the aforementioned interval, reproducing a check data recorded on the magnetic disc, so as to measure an error rate; and
- (iv) using the error rate measurement results so as to obtain an optimal position of the window.

2. A magnetic disc apparatus as claimed in claim 1, wherein the interval setting (i) is realized by dividing the range from the window initial position to the maximum modification position into a center region and a peripheral region with a predetermined ratio and by setting a greater number of measurement points in the center region than in the peripheral region.

3. A magnetic disc apparatus as claimed in claim 2, wherein the number of measurement points set in the center region is twice as many as the measurement points in the peripheral region.

4. A magnetic disc apparatus as claimed in claim 2, wherein the error rate measurement (iii) is realized by performing an error rate measurement twice or more for each of the measurement points of the center region and calculating an average error rate for each of the measurement points.

5. A magnetic disc apparatus comprising:

a magnetic disc for recording a data;

a reproduction head for reproducing a data recorded on the magnetic disc; and a signal processor for shaping a reproduction signal reproduced by the reproduction head and generating a pulse from the reproduction signal by using an optimized window, the signal processor including:
- (i) means for setting measurement points at an interval which is smaller in the vicinity of an initial position of a window than in the vicinity of a maximum modification position;
- (ii) means for shifting the window from the initial position up to the maximum modification position;
- (iii) means for reproducing a check data recorded on the magnetic disc so as to measure an error rate each time the window position is shifted according to the aforementioned interval; and
- (iv) means for using the error rate measurement results to obtain an optimal position of the window.

6. A magnetic disc apparatus comprising:

a magnetic disc for recording a data;

a reproduction head for reproducing a data recorded on the magnetic disc; and a signal processor for shaping a reproduction signal reproduced by the reproduction head and generating a pulse from the reproduction signal by using an optimized window, the signal processor having functions of
- (i) setting measurement points at an interval which is smaller in the vicinity of an initial position of a window than in the vicinity of a maximum modification position;
- (ii) shifting the window from the initial position up to the maximum modification position;
- (iii) each time the window position is shifted according to the aforementioned interval, reproducing a check data recorded on the magnetic disc, so as to measure an error rate;
- (iv) plotting the error rates obtained at the respective measurement points in the left (minus) side and the right (plus) side of the window initial position, so as to obtain a left plot curve and a right plot curve;
- (v) determining a distance between the left plot curve and the right plot curve at a target error rate, as a width of the window; and
- (iv) determining the position where the window width has been obtained, as a position of the window.

7. A magnetic disc apparatus as claimed in claim 6, wherein the window shifting interval is modified according to the error rate measurement results.

8. A magnetic disc apparatus as claimed in claim 6, wherein the window shifting interval between the measurement points is increased when an error rate obtained is greater than a predetermined error rate.

9. A magnetic disc apparatus comprising:

a magnetic disc for recording a data;

a recording/reproduction head for reproducing the data recorded on the magnetic disc and recording a data onto the magnetic disc data; and a signal processor for shaping a reproduction signal reproduced by the recording/reproduction head and controlling recording operation of the recording/reproduction head, wherein the signal processor includes: an active filter for shaping a waveform of a reproduction signal; a data synchronizer and a peak detector for producing a pulse from the signal output from the active filter; a recording controller for controlling a recording pulse timing and a recording current value, the signal processor further including: means for setting a cut-off frequency (fc), Boost, and delay (DLY) serving as parameters for controlling the characteristic of the active filter; means for setting the slice level (SLV) in the peak detector; means for setting the window shift in the synchronizer; means for setting a write pre-compensation serving as a timing of the write pulse of the recording controller; and means for setting a write current (Ic), wherein the signal processor determines an error rate according to possibility of mismatch between a read-out signal and a write-in signal while modifying the window shift setting and, for window margin calculation at a predetermined error rate (E1), sets measurement points at a smaller interval in a region around the window center than in a region far from the window center.

* * * * *